(12) United States Patent
Bindra et al.

(10) Patent No.: US 6,756,486 B1
(45) Date of Patent: Jun. 29, 2004

(54) NON-MIGRATING METALLIZED DISAZO GREEN SHADE YELLOW PIGMENT

(75) Inventors: Amrit P. Bindra, Brecksville, OH (US); Steven A. Zamborsky, Berea, OH (US)

(73) Assignee: Engelhard Corporation, Iselin, NJ (US)

( * ) Notice: Subject to any disclaimer, the term of this patent is extended or adjusted under 35 U.S.C. 154(b) by 0 days.

(21) Appl. No.: 10/666,435

(22) Filed: Sep. 18, 2003

(51) Int. Cl.[7] .................. C09B 63/00; C09D 11/00; C08K 5/23; G03G 9/09
(52) U.S. Cl. .................. 534/581; 534/582; 534/602; 534/700; 534/748; 534/DIG. 4; 106/31.81; 106/496; 430/108.23; 524/190
(58) Field of Search .................. 534/581, 582, 534/602, 700, 748, DIG. 4; 106/31.81, 496; 430/108.23; 524/190

(56) References Cited

U.S. PATENT DOCUMENTS

| | | |
|---|---|---|
| 3,872,078 A | 3/1975 | Cseh et al. |
| 3,978,038 A | 8/1976 | Cseh et al. |
| 4,100,157 A | 7/1978 | Muller et al. |
| 4,103,092 A | 7/1978 | Jefferies et al. |
| 4,146,558 A | 3/1979 | Jefferies et al. |
| 4,269,769 A | 5/1981 | Moiso et al. |
| 5,559,216 A | 9/1996 | Jung et al. |
| 5,616,778 A | 4/1997 | Goldmann et al. |
| 5,669,967 A | 9/1997 | Hays |
| 6,254,671 B1 | 7/2001 | Hays |

FOREIGN PATENT DOCUMENTS

| | | |
|---|---|---|
| CA | 1135688 | 11/1982 |
| CH | 1396526 | 6/1975 |
| CH | 1400533 | 7/1975 |
| CH | 585 247 | 2/1977 |
| CS | 185798 B | 10/1978 |
| CS | 188727 B | 7/1981 |
| DE | 431773 | 12/1924 |
| DE | 2336915 | 7/1975 |
| DE | 3501199 | 8/1985 |
| DE | 42 29 207 A1 | 3/1994 |
| EP | 25164 | 3/1981 |
| FR | 1203865 | 5/1958 |
| FR | 1384178 | 12/1963 |

*Primary Examiner*—Fiona T. Powers
(74) *Attorney, Agent, or Firm*—Melanie L. Brown; Amin & Turocy, LLP

(57) ABSTRACT

Disclosed are green shade yellow pigments represented by the Formula I:

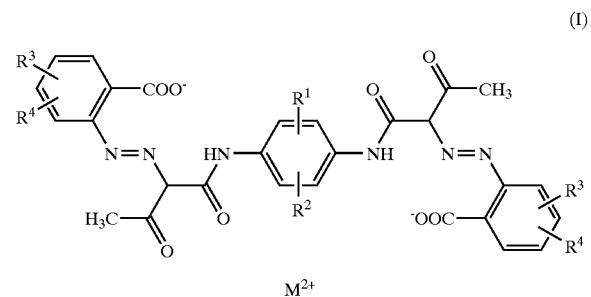

wherein $R^1$ and $R^2$ are independently selected from hydrogen, hydroxy, halogen, an alkyl group having 1 to about 4 carbon atoms, an alkoxy group having 1 to about 4 carbon atoms, a halo-alkyl group containing 1 to about 4 carbon atoms, an alkoxy carbonyl group having 1 to about 5 carbon atoms; $R^3$ and $R^4$ are independently selected from hydrogen, hydroxy, halogen, an alkyl group containing from 1 to about 4 carbon atoms, an alkoxy group containing from 1 to about 4 carbon atoms, and halo-alkyl groups containing from 1 to about 4 carbon atoms; and M is at least one divalent metal. Also disclosed are methods of making the green shade yellow pigments, methods of using the green shade yellow pigments, and coating compositions, ink compositions, electrostatic toner compositions, paint compositions, paper compositions, and plastic compositions containing the green shade yellow pigments.

29 Claims, No Drawings

NON-MIGRATING METALLIZED DISAZO GREEN SHADE YELLOW PIGMENT

FIELD OF THE INVENTION

The present invention generally relates to metallized disazo green shade yellow pigments which are excellent in at least one of color strength, brightness and heat stability, a process for their preparation, and use of the pigments in plastic, coating, and ink compositions.

BACKGROUND OF THE INVENTION

Azo yellow pigments are a class of colorants that are tinctorially strong and relatively inexpensive. Monoazo yellow pigments show good lighffastness and are particularly useful as coloring agents for paints and some printing inks. In plastics, however, monoazo yellow pigments tend to bloom and discolor at high temperatures. Monoazo yellow pigments also exhibit undesirable levels of bleed resistance.

Diarylide disazo yellow pigments, made from 3,3'-dichlorobenzidine, are much stronger tinctorially and show a much lower tendency to bloom and discolor at high temperatures. C.I. Pigment Yellow 17 is a strong green shade diarylide yellow and has often been used for plastics. W. Herbst and K. Hunger, Industrial Organic Pigments, VCH, New York, 1993, p. 252, state: "The plastics industry, however, uses P.Y. 17 extensively. P.Y. 17 is also frequently used in polyolefins. Its heat stability in these media was said to be about 220 to 240° C." However, R. Az et al reported in Dyes and Pigments, 15, 1 (1991), that diarylide yellows are degraded to potentially carcinogenic by products (e.g., 3,3'-dichlorobenzidine) in plastics processed above 200° C., a temperature lower than that used in processing most plastics (e.g., 230–330° C.). To overcome these disadvantages, azo pigment manufacturers have actively pursued development of alternative types of azo yellows.

One alternative type of azo yellows are disazo yellow pigments made by coupling bis(acetoacetamido)benzenes into aniline derivatives. U.S. Pat. No. 5,616,778 describes coupling 1,4-BAAAB into 2,5-dicarbomethoxyaniline (to give C.I. Pigment Yellow 155) and heating the pigment in an organic solvent at 80–150° C. for up to 6 hours. U.S. Pat. No. 5,559,216 relates to the preparation of printing inks involving the step of preparing disazo pigments in the presence of nonionic surfactants having a 5–90° C. cloud point to give pigments suitable for printing inks. This patent does not mention any metallized pigments. German Offenlegungsschrift 3501199 describes coupling 1,4-BAAAB into mixtures of anilines substituted with one or two carboalkoxy groups to give pigments that disperse easily into polypropylene. Canadian Patent 1135688 describes the pigments resulting from coupling 1,4-BAAAB into anilines substituted with nitro and carboalkoxy groups. Czech Patents 188727 and 185798 describe the pigments resulting from coupling 1,4-BAAAB into anilines substituted with urea groups. U.S. Pat. Nos. 4,146,558 and 4,103,092 describe coupling 1,4-BAAAB into anilines substituted with quaternized aminoalkyl or aminoalkoxy groups to give water-soluble dyes. Swiss Patent 585,247 describes coupling 1,4-BAAAB into an aminoquinoline derivative and heating with N,N-dimethylformamide at 140 C to obtain a greenish yellow pigment for coloring polyvinyl chloride plastics. U.S. Pat. No. 3,978,038 provides pigments resulting from coupling 1,4-BAAAB or various substituted 1,4-BAMBs into anilines substituted with nitro groups. U.K. Patents 1400533 and 1396526 describe the pigments resulting from coupling 1,4-BAAAB or various substituted 1,4-BAAABs into anilines substituted with a chlorine and methyl groups or two chlorine groups. German Offenlegungsschrift 2336915 describes the pigments resulting from coupling 1,4-BAAAB or various substituted 1,4-BAAABs into anilines substituted with nitro groups and other groups. U.S. Pat. No. 5,889,162 describes the pigments resulting from coupling 1,4-BAAAB or various substituted 1,4-BAAABs into o-phenetidine.

Another alternative type of azo yellows are the metallized monoazo yellows. C.I. Pigment Yellow 62 is a slightly redder yellow, but much weaker tinctorially than C.I. Pigment Yellow 17. A recent metallized monoazo yellow, disclosed in U.S. Pat. No. 5,669,967, is stronger tinctorially than C.I. Pigment Yellow 17, but is an even redder yellow (though not as red as metallized medium shade yellows C.I. Pigment Yellows 183 and 191). A metallized disazo yellow described in U.S. Pat. No. 6,254,671 is a green shade yellow, but much weaker than C.I. Pigment Yellow 17.

Two alternative yellow pigments are C.I. Pigment Yellow 109 (isoindolinone) and C.I. Pigment Yellow 138 (quinophthalone). These green shade yellows are very close in hue to C.I. Pigment Yellow 17, but are much more expensive, much weaker, and contain eight chlorine atoms per molecule, a potential environmental disadvantage.

Plastics processors that use diarylide yellows are particularly conscious of the increased costs of using the higher concentrations of weaker yellows required for coloring plastics to the required tinctorial strengths. Although one disazo pigment made from coupling 1,4-BAAAB, C.I. Pigment Yellow 155, is a commercial pigment, this pigment (Sandorin 4G) is much weaker and slightly redder than C.I. Pigment Yellow 17 and shows poor heat stability (see below) at 288 C, a temperature commonly used to process polypropylene and other plastics. Thus, there is a need for a new green shade yellow azo pigment that shows strength comparable to C.I. Pigment Yellow 17, as well as good heat stability and good lightfastness.

Pigments that are used in plastics for food and beverage packaging must resist extraction in order to avoid contaminating the packed consumable. Organic substances, such as ethyl alcohol, are common ingredients in food and beverages that could cause pigment extraction. Plastic processors have a limited choice in using Pigment Yellow 138 or Pigment yellow 180 for food and beverage packaging in the green-shade yellow color range. Thus, there is a need for economical green-shade yellow azo pigments that exhibit good color strength, heat stability and resistance to extraction/bleed resistance.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereinafter. The present invention generally relates to disazo yellow pigments suitable for use as coloring agents, processes for their preparation and their use in plastic, coating and ink compositions. The disazo yellow pigments exhibit both a desirable green shade and strength.

One aspect of the invention relates to laked disazo pigment compounds represented by Formula I:

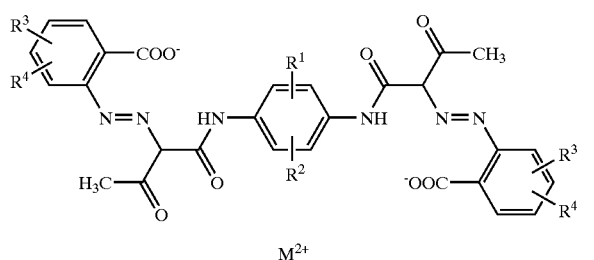

(I)

wherein $R^1$ and $R^2$ are independently selected from hydrogen, hydroxy, halogen, an alkyl group having 1 to about 4 carbon atoms, an alkoxy group having 1 to about 4 carbon atoms, a halo-alkyl group containing 1 to about 4 carbon atoms, an alkoxy carbonyl group having 1 to about 5 carbon atoms; $R^3$ and $R^4$ are independently selected from hydrogen, hydroxy, halogen, an alkyl group containing from 1 to about 4 carbon atoms, an alkoxy group containing from 1 to about 4 carbon atoms, and halo-alkyl groups containing from 1 to about 4 carbon atoms; and M is at least one divalent metal.

Another aspect of the invention relates to a method of making a green shade yellow pigment involving coupling a diazonium component containing a compound prepared from an aromatic amine represented by Formula II

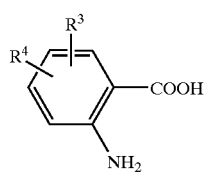

(II)

wherein $R^3$ and $R^4$ are as described above with a coupling component comprising a coupler represented by Formula III

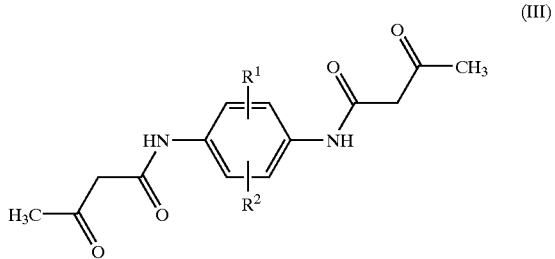

(III)

wherein $R^1$ and $R^2$ are as described above; and metallizing with a salt.

To the accomplishment of the foregoing and related ends, certain illustrative aspects of the invention are described herein in connection with the following description. These aspects are indicative, however, of but a few of the various ways in which the principles of the invention may be employed and the present invention is intended to include all such aspects and their equivalents. Other advantages and novel features of the invention will become apparent from the following detailed description of the invention.

DETAILED DESCRIPTION OF THE INVENTION

The present invention provides laked disazo yellow pigments, methods for their preparation, methods for their use, and compositions containing the laked disazo yellow pigments. The laked disazo yellow pigments of the present invention may be prepared by initially diazotizing one or more aromatic amines to provide one more diazonium components, coupling the diazonium component(s) with a coupling component to form the desired dye, and then laking the dye. The laked disazo yellow pigments have at least one of a desirable green shade, heat stability, good strength, bleed resistance, migration resistance, and low or no toxicity.

Aromatic amines suitable for the purposes of the present invention are characterized by Formula II:

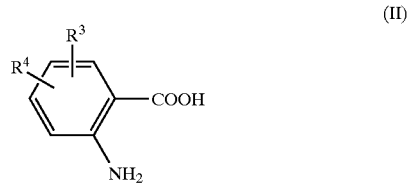

(II)

wherein $R^3$ and $R^4$ are independently selected from hydrogen, hydroxy, halogen, an alkyl group containing from 1 to about 4 carbon atoms, an alkoxy group containing from 1 to about 4 carbon atoms, and halo-alkyl groups containing from 1 to about 4 carbon atoms. Halogen atoms include fluorine, chlorine, bromine, and iodine. In another embodiment, $R^3$ and $R^4$ are independently selected from hydrogen, chloro, an alkyl group containing from 1 to about 3 carbon atoms, an alkoxy group containing from 1 to about 2 carbon atoms, and fluoro-alkyl groups containing from 1 to about 2 carbon atoms, such as trifluoromethyl. $R^3$ and $R^4$ may be the same or different. Alkyl groups specifically include methyl, ethyl, propyl, isopropyl, butyl, and isobutyl.

Examples of aromatic amines include 2-aminobenzoic acid; 2-amino-3-methylbenzoic acid; 2-amino-5-methylbenzoic acid; 2-amino-6-methylbenzoic acid; 2-amino-3-methoxybenzoic acid; 2-amino-3-hydroxybenzoic acid; 2-amino-3-chlorobenzoic acid; 2-amino-4-chlorobenzoic acid; 2-amino-5-chlorobenzoic acid; 2-amino-6-chlorobenzoic acid; 2-amino-5-bromobenzoic acid; 2-amino-4-fluorobenzoic acid; 2-amino-5-fluorobenzoic acid; 2-amino-6-fluorobenzoic acid; 2-amino-4,5-dimethoxybenzoic acid; 2-amino-3,5-diiodobenzoic acid; 2-amino-4,5-difluorobenzoic acid; 2-amino-3,5-dichlorobenzoic acid; salts thereof; and the like.

Mixtures of two or more amines where at least one of the amines is an aromatic amine represented by Formula II are within the scope of this invention. Amines not within the scope of Formula II are supplemental amines. A brief list of examples of supplemental amines include 2-aminonaphthalene-1-sulfonic acid, 2-amino-5-methoxy-benzenesulfonic acid; 2-amino-5-ethoxy-benzenesulfonic acid, 2-amino-4-chloro-5-methoxy-benzenesulfonic acid; 2-amino-4-chloro-5-ethoxy-benzenesulfonic acid; 2-amino-4-methyl-5-methoxy-benzenesulfonic acid; 2-amino-4-ethyl-5-methoxy-benzenesulfonic acid; 2-amino-4,5-dimethoxy-benzenesulfonic acid; 2-amino-4-methyl-5-ethoxy-benzenesulfonic acid; 2-amino-4-ethyl-5-ethoxy-benzenesulfonic acid; 2-amino-4,5-diethoxy-benzenesulfonic acid; 2-aminobenzene-1-sulfonic acid; 4-aminobenzene-1-sulfonic acid; 2-amino-5-methylbenzene-1-sulfonic acid; 3-amino-6-methylbenzene-1-sulfonic acid; 2-amino-4-chloro-5-methylbenzene-1-sulfonic acid; 2-amino-5-chloro-4-ethylbenzene-1-sulfonic acid; 2-amino-5-chloro-4-methylbenzene-1-sulfonic acid;

3-aminobenzoic acid; 4-aminobenzoic acid; 3-amino-2-methylbenzoic acid; 4-amino-3-methoxybenzoic acid; 4-amino-5-chloro-2-methoxybenzoic acid; 3-amino-4-chlorobenzoic acid; 1-naphthyl amine; 2-naphthyl amine; 4-aminonaphthalene-1-sulfonic acid; 4-aminobiphenyl-3'-sulfonic acid; 4,4'-diaminobiphenyl-2,2'-disulfonic acid 2-methoxy-4-nitroaniline; 2-methoxy-5-nitroaniline; 4-methoxy-2-nitroaniline; 2-amino-4-chloro-5-nitrotoluene; 2-chloro-4-nitroaniline; 2-chloro-5-nitroaniline; 4-chloro-2-nitroaniline; 4-chloro-3-nitroaniline; 5-chloro-2-nitroaniline; 5-chloro-2-methyl-4-nitroaniline; 2-chloro-4-methylaniline; 2-chloro-5-methylaniline; 2-chloro-6-methylaniline; 3-chloro-2-methylaniline; 3-chloro-4-methylaniline; 4-chloro-2-methylaniline; 5-chloro-2-methylaniline; 4-chloro-2-methoxy-5-methylaniline; 4-chloro-2,6-dinitroaniline; 6-chloro-2,4-dinitroaniline; 2-chloro-4,6-dimethylaniline; 3-chloro-2,6-diethylaniline; 4-chloro-2,6-dibromoaniline; 2-chloroaniline; 3-chloroaniline; 4-chloroaniline; 5-chloro-2-methoxyaniline; 3-chloro-4-methoxyaniline; aniline; 2-amino-3-methylphenol; 2-amino-4-methylphenol; 3-amino-2-methylphenol; 4-amino-3-methylphenol; salts thereof, and the like.

The diazotization of the aromatic amine(s) may be carried out in the manners known to those skilled in the art. For example, diazotization may be conducted through the use of alkali metal nitrites or lower alkyl nitrites together with an adequately strong acid such as a mineral acid. Examples of useful mineral acids include hydrochloric acid, sulfuric acid, nitric acid, nitrosyl sulfuric acid, and phosphoric acid. In one embodiment, the diazotization reaction can be conducted at a temperature in the range from about −20 to about +30° C. In another embodiment, the diazotization reaction can be conducted at a temperature in the range from about 0 to about 15° C.

Generally, bis(acetoacetamido)benzene couplers include 1,4-bis(acetoacetamido)benzene and substituted 1,4-bis(acetoacetamido)benzenes. The bis(acetoacetamido)benzene couplers suitable for use in the present invention are represented by Formula III:

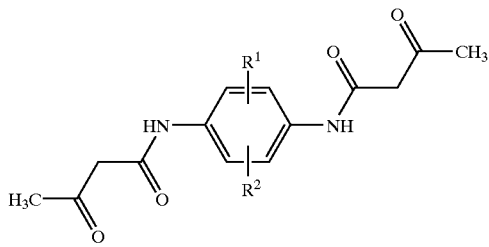

(III)

wherein $R^1$ and $R^2$ are independently selected from hydrogen, hydroxy, halogen, an alkyl group having 1 to about 4 carbon atoms, an alkoxy group having 1 to about 4 carbon atoms, a halo-alkyl group containing 1 to about 4 carbon atoms, and an alkoxy carbonyl group having 1 to about 5 carbon atoms. In another embodiment, $R^1$ and $R^2$ are independently selected from hydrogen, chloro, an alkyl group having 1 to about 2 carbon atoms, an alkoxy group having 1 to about 2 carbon atoms, a halo-alkyl group containing 1 to about 2 carbon atoms, and an alkoxy carbonyl group having 1 to about 3 carbon atoms. $R^1$ and $R^2$ may be the same or different. Alkoxy groups specifically include methoxy, ethoxy, propoxy, and butoxy.

Specific examples of bis(acetoacetamido)benzene couplers include 1,4-bis(acetoacetamido)benzene; 2-chloro-1,4-bis(acetoacetamido)benzene; 2-bromo-1,4-bis(acetoacetamido)benzene; 2-trifluoromethyl 1,4-bis(acetoacetamido)benzene; 2,6-bis-trifluromethyl 1,4-bis(acetoacetamido)benzene; 2-methoxycarbonyl-1,4-bis(acetoacetamido)benzene; 2-ethoxycarbonyl 1,4-bis(acetoacetamido)benzene; 2,5-diethoxycarbonyl-1,4-bis(acetoacetamido)benzene; 2-cyano-1,4-bis(acetoacetamido)benzene; 2-methyl-1,4-bis(acetoacetamido)benzene; 2-methoxy-1,4-bis(acetoacetamido)benzene; 2-ethyl-1,4-bis(acetoacetamido)benzene, 2-ethoxy-1,4-bis(acetoacetamido)benzene; 2-propoxy-1,4-bis(acetoacetamido)benzene; 2-isopropoxy-1,4-bis(acetoacetamido)benzene; 2-butoxy-1,4-bis(acetoacetamido)benzene; 2-phenoxy-1,4-bis(acetoacetamido)benzene; 2-nitro-1,4-bis(acetoacetamido)benzene; 2,5-dimethoxy-1,4-bis(acetoacetamido)benzene; 2,5-diethoxy-1,4-bis(acetoacetamido)benzene; 2-ethoxy-5-methoxy-1,4-bis(acetoacetamido)benzene; 2,5-dichloro-1,4-bis(acetoacetamido)benzene; 2,3-dichloro-1,4-bis(acetoacetamido)benzene; 2,6-dichloro-1,4-bis(acetoacetamido)benzene; 2,5-dibromo-1,4-bis(acetoacetamido)benzene; 2,6-dibromo-1,4-bis(acetoacetamido)benzene; 2-chloro-5-methoxy-1,4-bis(acetoacetamido)benzene; 2-chloro-5-ethoxy-1,4-bis(acetoacetamido)benzene; 2-chloro-5-methyl-1,4-bis(acetoacetamido)benzene; 2,5-dimethyl-1,4-bis(acetoacetamido)benzene; 2-methyl-5-methoxy-1,4-bis(acetoacetamido)benzene; 2-methyl-5-ethoxy-1,4-bis(acetoacetamido)benzene; 2-methyl-5-propoxy-1,4-bis(acetoacetamido)benzene; 2-methyl-5-isopropoxy-1,4-bis(acetoacetamido)benzene; and 2-methyl-5-butoxy-1,4-bis(acetoacetamido)benzene.

In one embodiment, the bis(acetoacetamido)benzene coupler may contain mixtures of two or more of any of the bis(acetoacetamido)benzene coupler components of Formula III. In another embodiment, the bis(acetoacetamido)benzene coupler may contain mixtures of two or more couplers where at least one of the couplers is a 1,4-bis(acetoacetamido)benzene of Formula III. Couplers not within the scope of Formula III are supplemental couplers. A brief list of examples of supplemental couplers includes hydroxynaphthalenesulfonic acid couplers, pyrazolone couplers, acetoacetanilide couplers, and the like.

The coupling reaction may be effected by adding the coupling components to the diazo components, or by adding the diazonium components to the coupling components. Coupling is generally effected at a temperature from about −20 to about 80° C. In another embodiment, coupling is effected at a temperature from about 0 to about 70° C. As in the diazotization reaction, coupling may be carried out in the presence or absence of a surface active agent and/or suitable organic solvent, such as all of those identified above in connection with the diazotization reaction. Coupling is generally effected at a pH of about 4 or more and about 12 or less. In another embodiment, coupling is effected at a pH of about 5 or more and about 11 or less.

Generally, the diazonium component is coupled with a slight stoichiometric excess of the coupling component. That is, two equivalents of the diazonium component are coupled with slightly more than two equivalents of the coupling component. In one embodiment, the ratio of equivalents of the diazonium component to the coupling component is from about 1.7:2 to about 2.1:2. In another embodiment, the ratio of equivalents of the diazonium component to the coupling component is from about 1.8:2 to about 2:2. In yet another embodiment, the ratio of equivalents of the diazonium component to the coupling component is from about 1.9:2 to about 2:2.

In one embodiment, the coupling component is dissolved in a basic solution such as an aqueous alkali metal hydroxide solution and reprecipitated with a dilute acid such as acetic acid before use in the coupling reaction.

In another embodiment, it is advantageous in one or more of the diazotization reaction, the coupling reaction, and the metallization reaction to include one or more appropriate surface active agents and/or organic solvents. Examples of surface active agents include amine oxide surfactants, and specifically cationic amine oxide surfactants, polymeric surfactants, ethoxylate surfactants, sulfosuccinate surfactants and derivatives thereof and specifically anionic sulfosuccinate surfactants and derivatives thereof. These surfactants are known in the art, and many of these surfactants are described in McCutcheon's "Volume I: Emulsifiers and Detergents", 2001, North American Edition, published by McCutcheon's Division MCP Publishing Corp., Glen Rock, N.J., and in particular, pp. 1–233 which describes a number of surfactants and is hereby incorporated by reference for the disclosure in this regard.

In one embodiment, the diazotization reaction mixture, the coupling reaction mixture, and/or the metallization reaction mixture contains from about 0.1 to about 20% by weight of a surface active agent (for example, about 4 wt. %). In another embodiment, the diazotization reaction mixture, the coupling reaction mixture, and/or the metallization reaction mixture contains from about 1 to about 10% by weight of a surface active agent.

Ethoxylate surfactants include alkylphenol ethoxylate surfactants. The alkyl group may contain 1 to about 24 and preferably 2 to about 18 carbon atoms. Examples include octylphenoxy polyethoxyethanol and nonylphenol ethoxylate. These materials are available from Dow Chemical under the trade designation Triton®, N42, N-57 and N-101. An alkylphenol ethoxylate surfactant may be an anionic surfactant or a nonionic surfactant. Specific examples include alkylpolyethylene glycol ether acetic acid, and ethoxylate anionic complexes. Specific compounds are commercially available from Clariant Chemicals under the general trade designation Sandopan® and from Condea Vista Company under the general trade designation "Marlowet." Alcohol Ethoxylate/propyloxylate surfactants include straight chain or branched alcohol ethoxylatelpropyloxylate. Specific compounds are commercially available from Rhodia under the general trade designation "Antarox".

Polymeric surfactants include fatty acid modified polymer resins, polyester hydrocarbons, and polycarboxy hydrocarbon compounds. Examples include those available from Efka.

Amine oxide surfactants include N,N-bis(2-hydroxyethyl)cocoalkylamine oxide, N,N-dimethylcocoalkylamine oxide, dimethyl (hydrogenated tallow) amine oxide, dimethylhexadecylamine oxide, bis(2-hydroxyethyl)tallowamine oxide, coco amidopropyl amine oxide, lauryl (12,14,16 blend) dimethyl amine oxide, myristyl dimethyl amine oxide, cocamidopropylamine oxide, and stearyl dimethylamine oxide. Examples include those under the trade designation Aromox available from Akzo Nobel Chemicals and specifically product designations C/12, C/12W, DMC, DMC-W, DMHT, DM16, and T/12; those under the trade designation Barlox® available from Lonza and specifically product designations C, 12 and 14; those under the trade designation DeMox available from DeForest Enterprises and specifically product designations CAPO and LAO; and those under the trade designation Schercamox available from Scher Chemicals and specifically product designation DMS.

Sulfosuccinate surfactants include disodium ethoxylated-alcohol half ester of sulfosuccinic acid, disodium ethoxylated nonylphenol half ester of sulfosuccinic acid, dicyclohexyl ester of sodium sulfosuccinic acid, disodium isodecyl sulfosuccinate, diamyl ester of sodium sulfosuccinic acid, dihexyl ester of sodium sulfosuccinic acid, sodium salt of sulfated nonylphenoxy polyethoxy ethanol, dioctyl ester of sodium sulfosuccinic acid, bis(tridecyl) ester of sodium sulfosuccinic acid, and disodium alkyl sulfosuccinate. Examples include those under the trade designation Aerosol available from Cytec Industries and specifically product designations A-102, A-103, A-196, A-268, AY, MA-801, NPES, OT, TR-70 and 501; those under the trade designation Geropon available from Rhodia and specifically product designations SDS, SS-O and 99; and those under the trade designation Mackanate available from The McIntyre Group and specifically product designations DOS-70M5 and DOS-75.

In one embodiment, it is advantageous in one or more of the diazotization reaction, the coupling reaction, and the metallization reaction to include one or more appropriate organic solvents. For example, suitable organic solvents include one or more of glacial acetic acid, lower alkanols, dioxane, formamide, dimethyl formamide, dimethyl sulfoxide, pyridine or N-methyl pyrrolidone. In another embodiment, it is advantageous in one or more of the diazotization reaction, the coupling reaction, and the metallization reaction not to include one or more organic solvents.

In another embodiment of the present invention, the dispersibility of the pigments of the present invention can be improved by adding alkali-soluble resin like products before, during, or after the coupling is completed. Various resin like materials can be added for this purpose, and these include for example, rosin resins, polymeric rosins, resin soap, chemically modified rosin resins, such as rosin-maleinate resins, alkyd resins, and other synthetic hydrocarbon resins with a higher acid number, or combination of these resins. The resins may be present in a product with free carboxyl groups that are capable of forming a salt, or may be partially or completely in the form of salts, for example, with alkali metal ions. It may also be advantageous to perform the coupling reaction in the presence of a finely divided insoluble material, for example, alkaline earth metal sulfates and carbonates, titanium dioxide or clay materials or very finely divided organic plastic materials.

In yet another embodiment, the coupling reaction is performed in the presence of a finely divided insoluble material. Examples of finely divided insoluble materials include alkaline earth metal sulfates and carbonates, titanium dioxide, clay materials such as kaolin, or very finely divided organic plastic materials.

It is to be noted that the unmetallized product obtained by coupling 1,4-bis(acetoacetamido)benzene into about two equivalents of anthranilic acid and represented by the following chemical structure of Formula IV:

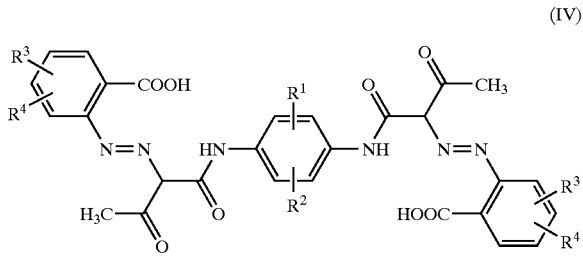

(IV)

that displays a red shade yellow color instead of a green shade yellow color of the present invention. If the above product is processed at a higher pH, one obtains the corresponding disodium salt represented by Formula V:

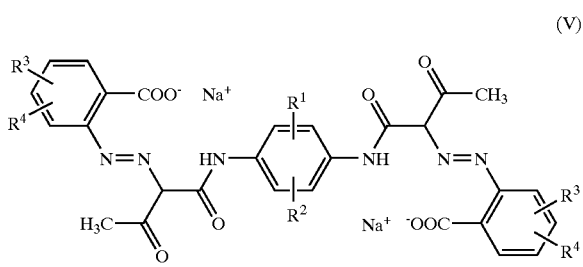

(V)

that displays very weak color and is not of commercial significance.

The coupled disazo compound is metallized with a suitable amount of divalent metal so that the compound is fully or substantially metallized (not partially metallized). Metallization is performed using about two equivalents of a monovalent salt or about one equivalent of a divalent metal salt which forms the carboxylate salt. This is also known as laking and forms a metallized pigment. The divalent metal salt may be a salt of at least one or more of alkaline earth metals, manganese, nickel, and zinc specifically including mixtures of two or more of these metals. Examples of alkaline earth metals include magnesium, calcium, strontium and barium. Examples of divalent metal salts include $CaCl_2$, $CaBr_2$, $CaF_2$, $Ca(NO_3)_2$, $MgCl_2$, $MgBr_2$, $MgF_2$, $Mg(NO_3)_2$, $MgSO_4$, $SrCl_2$, $SrBr_2$, $SrF_2$, $Sr(NO_3)_2$, $BaCl_2$, $BaBr_2$, $BaF_2$, $Ba(NO_3)_2$, $MnCl_2$, $MnBr_2$, $MnF_2$, $Mn(NO_3)_2$, $MnSO_4$, $NiCl_2$, $NiBr_2$, $Ni(NO_3)_2$, $NiSO_4$, $ZnCl_2$, $ZnBr_2$, $ZnF_2$, $Zn(NO_3)_2$, and $ZnSO_4$.

Metallization may be accomplished by adding the metal salt to the dye after coupling of the diazonium component present is complete or by including about one equivalent of the metal salt in the diazonium components whereby metallization occurs as the dye is formed (during coupling). If the unmetallized colorant is essentially insoluble in water then sometimes it is preferable to isolate the colorant by filtering and washing and subsequently metallize it with a divalent metal salt.

In most applications, it is desirable, in order to achieve the full brightness and tinctorial strength, to optionally heat the laked disazo yellow pigments. For example, the disazo yellow pigments may be heated to reflux temperature for about 0.25 to about 3 hours at temperatures about 100° C. or higher optionally under pressure in the presence or absence of the above described resin soaps or other soluble resins.

After completion of the reactions and optional heating, the disazo yellow pigments are recovered from the water based reaction slurry by filtering to form a press cake of pigment which is washed with hot water (e.g., from about 40 to about 70° C.) so as to remove the excess acids, bases and unwanted salts formed during the coupling reaction. The press cake is typically washed with from about 10 to about 20 times its volume of water. The filter cake is generally washed until the filtrate gives only a slightly positive test for chloride ion. The washed press cakes can be dried, ground and used in the form of a coarse or finely divided powder. Alternatively, the disazo yellow pigments of this invention can be dispersed into oleoresinous vehicles to prepare flushed bases or dispersed into aqueous or organic vehicles to prepare aqueous dispersions or organic pigment compositions.

The green shade yellow pigments of the present invention are represented by Formula I:

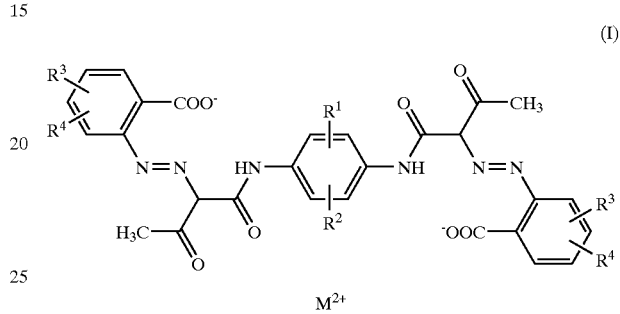

(I)

wherein $R^1$ and $R^2$ are independently selected from hydrogen, hydroxy, halogen, an alkyl group having 1 to about 4 carbon atoms, an alkoxy group having 1 to about 4 carbon atoms, a halo-alkyl group containing 1 to about 4 carbon atoms, an alkoxy carbonyl group having 1 to about 5 carbon atoms; $R^3$ and $R^4$ are independently selected from hydrogen, hydroxy, halogen, an alkyl group containing from 1 to about 4 carbon atoms, an alkoxy group containing from 1 to about 4 carbon atoms, and halo-alkyl groups containing from 1 to about 4 carbon atoms; and M is at least one divalent metal, such as barium, calcium, magnesium, strontium, manganese, nickel, and zinc. In one embodiment, the green shade yellow pigments of the present invention are free of halogen atoms.

In one specific embodiment, the present invention relates to coupling 1,4-bis(acetoacetamido)benzene or substituted 1,4-bis(acetoacetamido)benzene into about two equivalents of anthranilic acid and metallizing with a divalent metal to give a metallized disazo yellow pigment represented by Formula VI:

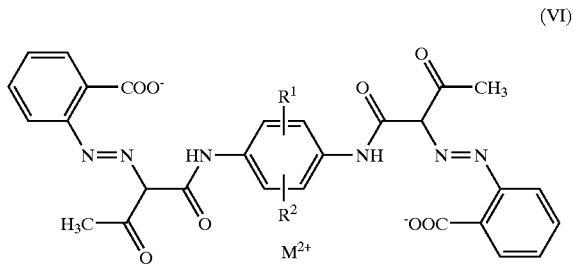

(VI)

wherein M is a divalent metal such as Ca, Sr, Ba, Mg, or Zn; and $R^1$ and $R^2$ are independently hydrogen, halogen, an alkyl group containing 1 to about 4 carbon atoms, an alkoxy group containing 1 to about 4 carbon atoms, an alkoxycarbonyl group containing 1 to about 5 carbon atoms, or a halo-alkyl group containing 1 to about 4 carbon atoms, such as trifluoromethyl.

In another specific embodiment, the present invention relates to coupling 1,4-bis(acetoacetamido)benzene into about two equivalents of anthranilic acid and metallizing with a divalent metal to give a metallized disazo yellow pigment represented by Formula VII:

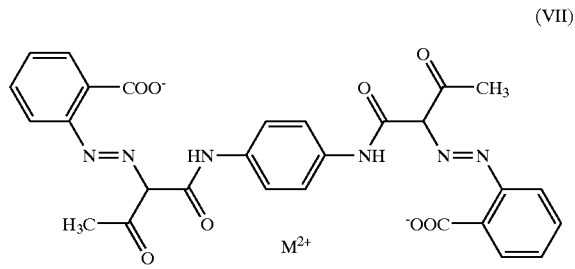

(VII)

wherein M is a divalent metal such as Ca, Sr, Ba, Mg, or Zn.

In yet another specific embodiment, the present invention relates to coupling 1,4-bis(acetoacetamido)benzene into about two equivalents of anthranilic acid and metallizing with calcium to give a metallized disazo yellow pigment represented by Formula VIII:

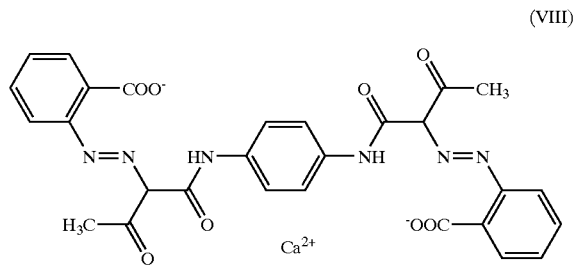

(VIII)

In still yet another specific embodiment, the present invention relates to coupling 1,4-bis(acetoacetamido)benzene into about two equivalents of anthranilic acid and metallizing with strontium to give a metallized disazo yellow pigment represented by Formula IX:

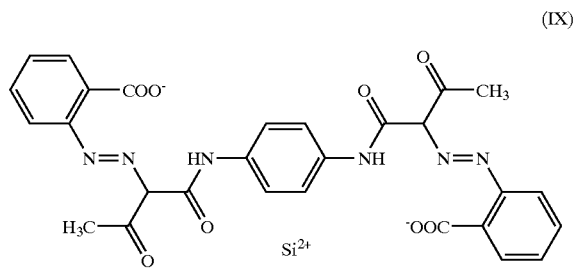

(IX)

The pigments and pigment compositions of this invention provide strong green shade yellow pigments exhibiting at least one of resistance to organic solvents while having good color strength, light fastness and/or heat stability and are useful as coloring agents in plastics, coatings, papers, electrostatic toners, and inks. This invention, therefore, also relates to coatings, ink, electrostatic toner, paper, and plastic compositions comprising major amounts of a coating vehicle, ink vehicle, paper vehicle, electrostatic toner, or plastic and minor amounts of the metallized disazo yellow pigment(s) of this invention. In one embodiment, the present invention relates to plastics comprising the metallized disazo pigment and another fine particulate material such as clay, kaolin, silica, or titanium dioxide. Major amounts include at least 50% by weight whereas minor amounts include less than 50% by weight.

The paint, ink, plastic, powder coating, electrostatic toner, and paper compositions in which the compositions of this invention are useful are known to those of ordinary skill in the art. Examples include printing inks, lacquers, thermoplastic and thermosetting materials, natural resins and synthetic resins, polystyrene and its mixed polymers, polyolefins, in particular polyethylene and polypropylene, polyacrylic compounds, polyvinyl compounds, for example polyvinyl chloride and polyvinyl acetate, rubber, and also filaments made of viscose and cellulose ethers, cellulose esters, polyamides, polyurethanes, polyesters, for example polyglycol terephthalates, polycarbonates, polyimides, and polyacrylonitrile. Polyolefins specifically include high density polyethylene, medium density polyethylene, low density polyethylene, very low density polyethylene, and linear low density polyethylene.

Due to the high resistance to extraction by organic solvents and excellent heat resistance, these pigments are particularly suitable for the pigmenting of plastics in the mass, such as, for example, of polystyrene and its mixed polymers, polyolefins, in particular polyethylene and polypropylene and the corresponding mixed polymers, polyvinyl chloride and polyesters in particular polyethylene glycol terephthalate and polybutylene terephthalate and the corresponding mixed condensation products based on polyesters.

Organic solvents to which the metallized disazo pigments have high resistance to extraction include alcohols, such as ethanol. In one embodiment, the metallized disazo pigments have high resistance to alcohol extraction. In a specific embodiment, when a plastic composition containing the metallized disazo pigment and low density polyethylene is exposed to 10% ethanol solution or a 95% ethanol solution at about 65° C. for about 3 days, an extracted color in the solution is not observed. In another specific embodiment, when a plastic composition containing the metallized disazo pigment and low density polyethylene is exposed to 10% ethanol solution or a 95% ethanol solution at about 65° C. for about 4 days, an extracted color in the solution is not observed.

See, for example, with regard to ink: R. H. Leach, editor, The Printing Ink Manual, Fourth Edition, Van Nostrand Reinhold (International) Co.Ltd., London (1988), particularly pages 282–591; with regard to paints: C. H. Hare, Protective Coatings, Technology Publishing Co., Pittsburgh (1994), particularly pages 63–288; and with regard to plastics: T. G. Webber, Coloring of Plastics, John Wiley & Sons, New York (1979), particularly pages 79–204. The foregoing references are hereby incorporated by reference herein for their teachings of ink, paint, and plastic compositions, formulations and vehicles in which the compositions of this invention may be used including amounts of colorants. For example, the pigment may be used at a level from about 10 to about 15% by weight in an offset lithographic ink, with the remainder being a vehicle containing gelled and ungelled hydrocarbon resins, alkyd resins, wax compounds and aliphatic solvent. The pigment may also be used, for example, at a level from about 1 to about 10% by weight in an interior paint formulation along with other pigments, which could include titanium dioxide, acrylic latices, coalescing agents, water or solvents. The pigment may also be used, for example, at a level from about 20 to about 30% by weight in a plastic color concentrate in polyethylene.

The following examples illustrate the present invention. Unless otherwise indicated in the following examples and elsewhere in the specification and claims, all parts and percentages are by weight, all temperatures are in degrees Centigrade, and pressure is at or near atmospheric pressure.

EXAMPLE 1

A diazo slurry is prepared by dissolving 26.7 parts of anthranilic acid in 435 parts of water and 31.9 parts of 20 Baume hydrochloric acid. The solution is cooled to 0° C. by the addition of ice and diazotized by the addition of 54.1 parts of a 25% solution of sodium nitrite and stirring the slurry at 0–5° C. for 40 minutes. Excess nitrite is quenched with sulfamic acid. Temperature is adjusted to 0–2° C. and 0.6 parts of bis(2-hydroxyethyl)cocoamine oxide are added.

A coupler slurry is prepared by dissolving 26.3 parts of 1,4-bis(acetoacetamido)benzene by heating in 500 parts of water containing 19.3 parts of 50% sodium hydroxide. Bis(2-hydroxyethyl)cocoamine oxide (1.8 parts) is added and the slurry is cooled to 20° C. with ice. The pH of the slurry is adjusted to 9.5 and the slurry is heated to 55° C.

The diazo slurry is coupled into the coupler slurry over a period of 30 minutes while maintaining the pH at 8+/−0.3. The pH of the slurry is then raised to 10.4 by addition of 10% solution of sodium hydroxide. The mixture is stirred an hour, pH is adjusted to 9.5 and stirred for another 20 minutes. The slurry is heated at a rate of approximately 1° C./minute to 70° C., held at 70° C. for 30 minutes, heated to 98° C. and held for an hour. The slurry is then iced to 90° C. and a linear alcohol ethoxylate/propoxylate (5.2 parts) is added. Then pH is adjusted to 5.2 and held for 30 minutes. Calcium chloride dihydrate (18 parts) is then added followed by addition of 3 parts of a linear alcohol ethoxylate/propoxylate. The mixture is held at 90° C. for an hour and iced to 70° C. The pH is adjusted to 6.8, held for 30 minutes and filtered. The filter cake is washed with water, dried overnight at 80° C. and pulverized to give a yellow pigment powder.

EXAMPLE 2

The procedure of Example 1 is repeated except that instead of 18 parts of calcium chloride dihydrate 24 parts of strontium nitrate are added.

Comparative Example 1

The procedure of Example 1 is repeated except that no calcium chloride dehydrate is added and after holding the pigment slurry at 98° C., cooling to 90° C. and addition of linear alcohol ethoxylate/propoxylate the pH is adjusted to 4.5, held for 30 minutes heated to boil and boiled for one hour. The slurry is then iced to 70° C. and filtered. The filter cake is washed with water, dried overnight at 80° C. and pulverized to give a yellow powder.

Comparative Example 2

The procedure Example 1 is followed except that no calcium chloride dehydrate is added and after holding the slurry at 98° C. for an hour it is iced to 70° C. and filtered. The filter cake is washed with water, dried overnight at 80° C. and pulverized to give a yellow powder.

Test Method

A mixture of 0.5 parts pigment, 5.0 parts titanium dioxide (DuPont Ti-Pure R-960) and 500 parts high density polyethylene (Solvay T50-2000-G) is shaken on a paint shaker to uniformity, then injection molded at 232° C. in a 30 ton Battenfield machine. Spectrophotometric values are measured with a Macbeth Color-Eye (specular component included, large area) to give the apparent strength and hue angle under Illuminant D, 10°, shown in the Table I.

TABLE I

| Pigment | Hue Angle | Chroma | Apparent Strength (K/S) |
| --- | --- | --- | --- |
| Example 1 | 92.0 | 71.3 | 8.43 (Standard) |
| Example 2 | 92.5 | 70.7 | 8.35 (0.9% weak) |
| Comp. Example 1 | 80.3 | 63.3 | 8.34 (1% Weak) |
| Comp. Example 2 | 93.0 | 32.2 | 1.60 (81% weak) |

Hue Angle is evaluated based on a hue circle where 0°/360° corresponds to red, 90° corresponds to yellow, 180° corresponds to green, and 270° corresponds to blue. The higher hue angles for the pigments of Example 1 and 2 indicate that these are much greener shade yellow pigments than the pigment of Comparative Example 1. Chroma refers to pigment brightness and color intensity. The higher the Chroma value, the brighter and more intense the pigment. The higher Chroma values of the pigments of Example 1 and 2 indicate that these are markedly brighter and intense pigments compared to the pigment of Comparative Example 2. K/S value measures the color strength of a pigment. The higher the K/S value, the stronger the pigment. The higher K/S values of the pigment of Example 1 and 2 further indicate that these pigments are markedly stronger pigments compared to the pigment of Comparative Example 2.

While the invention has been explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A green shade yellow pigment represented by Formula I:

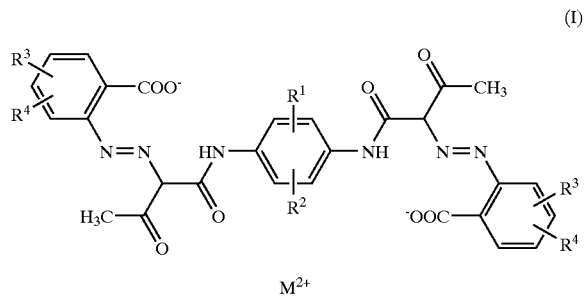

wherein $R^1$ and $R^2$ are independently selected from hydrogen, hydroxy, halogen, an alkyl group having 1 to about 4 carbon atoms, an alkoxy group having 1 to about 4 carbon atoms, a halo-alkyl group containing 1 to about 4 carbon atoms, an alkoxy carbonyl group having 1 to about 5 carbon atoms; $R^3$ and $R^4$ are independently selected from hydrogen, hydroxy, halogen, an alkyl group containing from 1 to about 4 carbon atoms, an alkoxy group containing from 1 to about 4 carbon atoms, and halo-alkyl groups containing from 1 to about 4 carbon atoms; and M is at least one divalent metal.

2. The green shade yellow pigment according to claim 1, wherein M is at least one of barium, calcium, magnesium, strontium, manganese, nickel, and zinc.

3. The green shade yellow pigment according to claim 1, $R^1$ and $R^2$ are independently selected from hydrogen, chloro, an alkyl group having 1 to about 2 carbon atoms, an alkoxy group having 1 to about 2 carbon atoms, a halo-alkyl group containing 1 to about 2 carbon atoms, and an alkoxy carbonyl group having 1 to about 3 carbon atoms; and $R^3$ and $R^4$ are independently selected from hydrogen, chloro, an alkyl group containing from 1 to about 3 carbon atoms, an alkoxy group containing from 1 to about 2 carbon atoms, and fluoro-alkyl groups containing from 1 to about 2 carbon atoms.

4. The green shade yellow pigment according to claim 1, wherein at least one of $R^1$, $R^2$, $R^3$, and $R^4$ are halogen.

5. The green shade yellow pigment according to claim 1, wherein $R^1$, $R^2$, $R^3$, and $R^4$ are hydrogen.

6. The green shade yellow pigment according to claim 1, wherein $R^1$, $R^2$, $R^3$, and $R^4$ are the same.

7. The green shade yellow pigment according to claim 1, wherein at least two of $R^1$, $R^2$, $R^3$, and $R^4$ are hydrogen.

8. A green shade yellow pigment represented by Formula VIII:

(VIII)

9. A green shade yellow pigment represented by Formula IX:

(IX)

10. A method of making a green shade yellow pigment, comprising:

coupling a diazonium component comprising a compound prepared from an aromatic amine represented by Formula II (II)

wherein $R^3$ and $R^4$ are independently selected from hydrogen, hydroxy, halogen, an alkyl group containing from 1 to about 4 carbon atoms, an alkoxy group containing from 1 to about 4 carbon atoms, and halo-alkyl groups containing from 1 to about 4 carbon atoms with a coupling component comprising a coupler represented by Formula III (III)

wherein $R^1$ and $R^2$ are independently selected from hydrogen, hydroxy, halogen, an alkyl group having 1 to about 4 carbon atoms, an alkoxy group having 1 to about 4 carbon atoms, a halo-alkyl group containing 1 to about 4 carbon atoms, an alkoxy carbonyl group having 1 to about 5 carbon atoms; and metallizing with a divalent salt.

11. The method according to claim 10, wherein at least one of coupling and metallizing is effected in the presence of a surfactant.

12. The method according to claim 10, wherein the divalent salt comprises at least one of $CaCl_2$, $CaBr_2$, $CaF_2$, $Ca(NO_3)_2$, $MgCl_2$, $MgBr_2$, $MgF_2$, $Mg(NO_3)_2$, $MgSO_4$, $SrCl_2$, $SrBr_2$, $SrF_2$, $Sr(NO_3)_2$, $BaCl_2$, $BaBr_2$, $BaF_2$, $Ba(NO_3)_2$, $MnCl_2$, $MnBr_2$, $MnF_2$, $Mn(NO_3)_2$, $MnSO_4$, $NiCl_2$, $NiBr_2$, $Ni(NO_3)_2$, $NiSO_4$, $ZnCl_2$, $ZnBr_2$, $ZnF_2$, $Zn(NO_3)_2$, and $ZnSO_4$.

13. The method according to claim 10, wherein coupling effected at a temperature from about −20 to about 80° C. and at a pH of about 4 or more and about 12 or less.

14. The method according to claim 10, wherein coupling is effected at a temperature from about 0 to about 70° C. and at a pH of about 5 or more and about 11 or less.

15. The method according to claim 10, wherein a ratio of equivalents for coupling of the diazonium component to the coupling component is from about 1.7:2 to about 2.1:2.

16. The method according to claim 10, further comprising heating for about 0.25 to about 3 hours at temperatures about 100° C. or higher.

17. The method according to claim 10, wherein the aromatic amine comprises at least one of 2-aminobenzoic acid; 2-amino-3-methylbenzoic acid; 2-amino-5-methylbenzoic acid; 2-amino-6-methylbenzoic acid; 2-amino-3-methoxybenzoic acid; 2-amino-3-hydroxybenzoic acid; 2-amino-3-chlorobenzoic acid; 2-amino-4-chlorobenzoic acid; 2-amino-5-chlorobenzoic acid; 2-amino-6-chlorobenzoic acid; 2-amino-5-bromobenzoic acid; 2-amino-4-fluorobenzoic acid; 2-amino-5-fluorobenzoic acid; 2-amino-6-fluorobenzoic acid; 2-amino-4,5-dimethoxybenzoic acid; 2-amino-3,5-diiodobenzoic acid; 2-amino-4,5-difluorobenzoic acid; 2-amino-3,5-dichlorobenzoic acid; and salts thereof.

18. The method according to claim 10, wherein the coupler comprises at least one of 1,4-bis(acetoacetamido)benzene; 2-chloro-1,4-bis(acetoacetamido)benzene; 2-bromo-1,4-bis(acetoacetamido)benzene; 2-trifluoromethyl 1,4-bis(acetoacetamido)benzene; 2,6-bis-trifluromethyl 1,4-bis(acetoacetamido)benzene; 2-methoxycarbonyl-1,4-bis(acetoacetamido)benzene; 2-ethoxycarbonyl 1,4-bis(acetoacetamido)benzene; 2,5-diethoxycarbonyl-1,4-bis(acetoacetamido)benzene; 2-cyano-1,4-bis(acetoacetamido)benzene; 2-methyl-1,4-bis(acetoacetamido)benzene; 2-methoxy-1,4-bis(acetoacetamido)benzene; 2-ethyl-1,4-bis(acetoacetamido)benzene; 2-ethoxy-1,4-bis(acetoacetamido)benzene;

2-propoxy-1,4-bis(acetoacetamido)benzene; 2-isopropoxy-1,4-bis(acetoacetamido)benzene; 2-butoxy-1,4-bis(acetoacetamido)benzene; 2-phenoxy-1,4-bis(acetoacetamido)benzene; 2-nitro-1,4-bis(acetoacetamido)benzene; 2,5-dimethoxy-1,4-bis(acetoacetamido)benzene; 2,5-diethoxy-1,4-bis(acetoacetamido)benzene; 2-ethoxy-5-methoxy-1,4-bis(acetoacetamido)benzene; 2,5-dichloro-1,4-bis(acetoacetamido)benzene; 2,3-dichloro-1,4-bis(acetoacetamido)benzene; 2,6-dichloro-1,4-bis(acetoacetamido)benzene; 2,5-dibromo-1,4-bis(acetoacetamido)benzene; 2,6-dibromo-1,4-bis(acetoacetamido)benzene; 2-chloro-5-methoxy-1,4-bis(acetoacetamido)benzene; 2-chloro-5-ethoxy-1,4-bis(acetoacetamido)benzene; 2-chloro-5-methyl-1,4-bis(acetoacetamido)benzene; 2,5-dimethyl-1,4-bis(acetoacetamido)benzene; 2-methyl-5-methoxy-1,4-bis(acetoacetamido)benzene; 2-methyl-5-ethoxy-1,4-bis(acetoacetamido)benzene; 2-methyl-5-propoxy-1,4-bis(acetoacetamido)benzene; 2-methyl-5-isopropoxy-1,4-bis(acetoacetamido)benzene; and 2-methyl-5-butoxy-1,4-bis(acetoacetamido)benzene.

19. The method according to claim 10, wherein the aromatic amine comprises a supplemental amine not represented by Formula II.

20. The method according to claim 10, wherein the coupler comprises a supplemental coupler comprising at least one of hydroxynaphthalenesulfonic acid couplers, pyrazolone couplers, and acetoacetanilide couplers.

21. A plastic composition comprising a major amount of a plastic and a minor amount of the green shade yellow pigment according to claim 1.

22. The plastic composition according to claim 21, wherein the plastic comprises at least one selected from the group consisting of polystyrene, polyolefins, polyacrylic compounds, polyvinyl compounds, polyesters, filaments made of viscose and cellulose ethers, cellulose esters, polyamides, polyurethanes, polycarbonates, polyimides, and polyacrylonitrile.

23. A plastic composition comprising a major amount of a plastic and a minor amount of the green shade yellow pigment composition according to claim 8.

24. A plastic composition comprising a major amount of a plastic and a minor amount of the green shade yellow pigment composition according to claim 9.

25. A plastic composition comprising a major amount of a plastic and a minor amount of the green shade yellow pigment composition made according to claim 10.

26. A coating composition comprising a major amount of a coating vehicle and a minor amount of the green shade yellow pigment according to claim 1.

27. A coating composition comprising a major amount of a coating vehicle and a minor amount of the green shade yellow pigment composition made according to claim 10.

28. An ink composition comprising a major amount of an ink vehicle and a minor amount of the green shade yellow pigment according to claim 1.

29. An electrostatic toner composition comprising a major amount of an electrostatic toner and a minor amount of the green shade yellow pigment according to claim 1.

* * * * *